Oct. 20, 1959
P. CIBIE
2,909,693
HEADLAMP, NOTABLY VEHICLE HEADLAMP
Filed Feb. 7, 1955
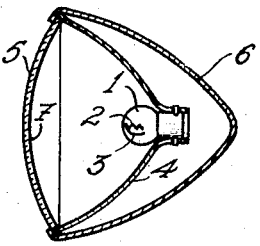
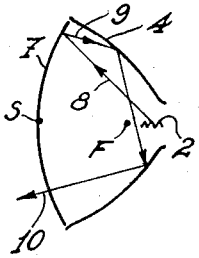 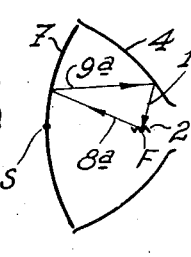 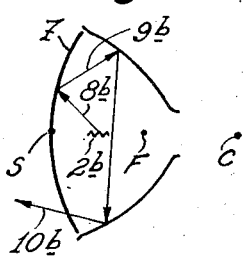 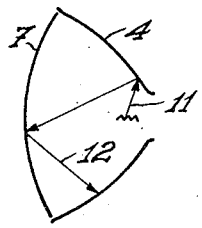
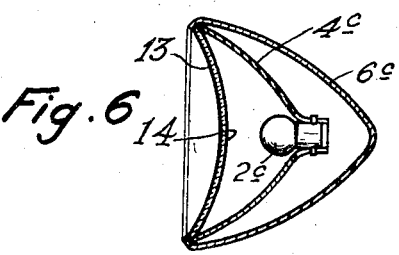 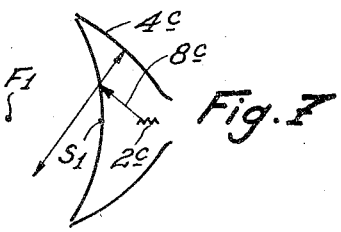
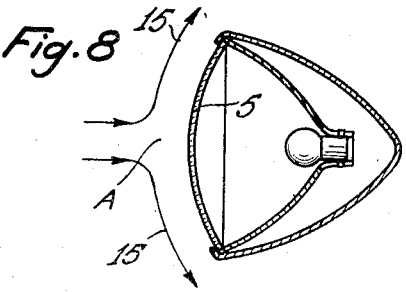 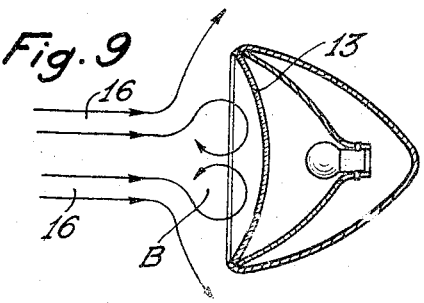
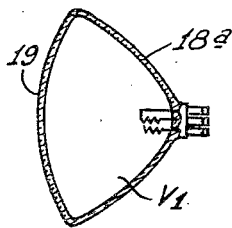 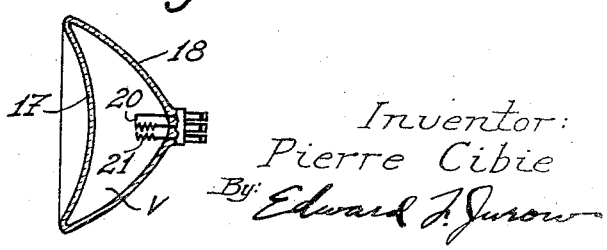
Inventor:
Pierre Cibie
By: Edward J. Jurow
Atty.

United States Patent Office 2,909,693
Patented Oct. 20, 1959

2,909,693

HEADLAMP, NOTABLY VEHICLE HEADLAMP

Pierre Cibie, Paris, France

Application February 7, 1955, Serial No. 486,319

Claims priority, application France February 10, 1954

6 Claims. (Cl. 313—113)

The present invention relates to improvements in headlamps, more particularly in automobile or vehicle headlamps.

Initially, the front glasses or lenses of automobile headlamps had a flat and smooth outer surface. Then, in view of obtaining various optical effects, these headlamps have been provided with flat lenses formed with ribs of many different shapes and arrangements.

The lenses now employed in replacement of the former flat ribbed lenses present a convex outer surface and have been preferred for purely aesthetical reasons. Technically, on the contrary, they offer a few drawbacks. By regulating the air-flow, they promote the formation of dust and mud deposits on their outer face. On the other hand, the pair of partly-reflecting surfaces of these lenses constitute virtual concave mirrors to the inner light rays, thereby producing stray images of the filaments which originate additional light sources such that, due to their locations, they introduce undesired rays in the headlamp beam, particularly in the dipped condition of the headlamps or when two cars meet, so that they become a cause of dazzle.

The object of the present invention is to provide a headlamp the front lens of which is so shaped as to avoid any formation of dust and mud deposit on its outer face and any production of stray images of the filaments.

For this purpose, according to the present invention, the front lens of the headlamp has an outer concave surface. Such an outer-concavity lens may be used for headlamps either of the sealed-beam type or of the conventional type with independent bulb.

The following description made with reference to the accompanying drawings given by way of non limitative examples will afford a clearer understanding of the invention and of the manner in which the same may be carried out in the practice. In the drawings:

Fig. 1 is a diagrammatical axial section showing a conventional headlamp with independent bulb equipped with a lens having its convex face turned to the outside.

Figs. 2, 3, 4 and 5 are explanatory diagrams showing the consequential effects of the reflection of light rays by a headlamp lens having its convex face turned to the outside.

Fig. 6 is a diagrammatical axial section showing a headlamp with independent bulb equipped with an outer-concavity lens according to the invention.

Fig. 7 is an explanatory diagram showing the paths of light rays in a headlamp equipped with an outer-concavity lens.

Fig. 8 illustrates the air-flow impinging on the convex lens surface of a conventional headlamp with independent bulb.

Fig. 9 illustrates the air-flow impinging on the concave lens surface fo a headlamp with independent bulb according to the invention.

Fig. 10 is a diagrammatical axial section showing a conventional headlamp of the sealed-beam type.

Fig. 11 is a diagrammatical axial section showing a headlamp of the sealed-beam type according to the invention.

The conventional headlamp illustrated in Fig. 1 comprises a bulb 1 having two filaments 2 and 3, the former corresponding to the highway- or normal lighting and the other to the crossing or dipped lighting. Said bulb is mounted approximately at the focus of a paraboloidal reflector 4 the open end of which is covered by a removable convex lens 5 having its convex face turned outwardly. The thus obtained assembly is housed within a casing 6.

With respect to the light sources 2 or 3 the inner face 7 of the lens 5 constitutes a concave mirror having a vertex S, a focus F and a center of curvature C (Figs. 2 to 4).

Considering the diagram of Fig. 2, the filament 2 positioned between F and C will form through partial reflection of the direct rays 8 on the inner surface 7 of the lens 5 reflected rays 9 impinging on the mirror 4 and therefore stray rays 10 are introduced in the main or headlamp beam.

In the case shown in Fig. 3 the filament 2a is positioned in the vicinity of the focus F and the reflected ray 9a, after reflection on the mirror 4, will produce a stray ray 10a returning to the filament 2a if the focus of the reflector 4 is close to the focus F.

In the case of Fig. 4, the filament 2b positioned in front of the focus F will yield an external virtual image and the reflected ray 9b will still introduce in the main beam a stray ray 10b.

Fig. 5 shows the influence of a ray 11 issuing from the source 2 as it is reflected firstly by the reflector 4 and then partly by the inner surface 7 of the lens 5 to yield a stray ray 12 impinging on the reflector 4.

If the focus F is close to the focus of reflector 4, the stray effect will be particularly apparent in the form of an increase in the brightness of the lower half of the reflector 4 when the crossing or dipped light is switched on.

If the two focuses are relatively remote from each other, rays such as 10a or 12 may illuminate the filament carrier or the glass bulb proper so as to create secondary sources originating dazzling rays under crossing or dipped light conditions.

Obviously, it is not possible to avoid the stray effect of these reflections from both filaments 2 and 3 simultaneously.

In the case of the headlamp shown diagrammatically in Figs. 6 and 7 the bulb 1c is associated with a paraboloidal reflector 4c, an outer-concavity lens 13 and a casing 6c. The outer-concavity lens 13 constitutes by its inner face 14 with respect to the source of light 2c a convex reflector having a vertex $S_1$, a focus $F_1$ and a center of curvature $C_1$. Since the source of light 2c is located beyond the vertex $S_1$ of the convex reflector 14 with respect to the focus $F_1$ thereof, as well known, the image of said source 2c reflected by this convex reflector 14 is a virtual image always located between $F_1$ and $S_1$. Therefore, whether the rays are direct as in the case of 8c, or previously reflected by the paraboloidal reflector 4c, the stray images will always be formed at the outside of the optical unit and the stray rays issuing from these images can neither strike the reflector nor increase the brightness of the lower half of the reflector when the headlamp is switched to its crossing or dipped light conditions. Moreover, there is no concentration of the light rays inside the optical unit, whereby any risk of creating secondary sources is suppressed completely. Thus, the main causes of dazzling are avoided.

To simplify the disclosure, the lens 5 or 13 is assumed to be of part-spherical configuration. If the lens were not spherical, the effect would not be strictly the same in all the planes passing through the handlamp axis, but the general inferences set forth hereinabove would still be cogent.

As shown in Fig. 8 of the drawing, the air-flow 15 impinging on the front face of the externally convex lens 5 of a conventional headlamp is deflected more or less regularly, the headlamp profile being substantially streamlined. A maximum-pressure zone A is formed at which the air velocity is substantially zero (stagnation point), thereby promoting the formation of deposits of dust or other materials in suspension in the atmosphere. In contradistinction thereto, in the headlamp illustrated in Fig. 9 and provided according to the invention with an externally concave lens 13, the air-flow 16 impinging on the lens creates a highly turbulent air stream at B, whereby any substances which otherwise might tend to form a deposit on the front face of the lens are carried along.

The equipment of headlamps of the sealed-beam type with outer-concavity lenses generates a further advantage. In fact, when considering Figs. 10 and 11, the inner volume V defined between the externally concave glass lens section 17 and the concave glass reflector section 18 to the periphery of which said lens is fusion-sealed (Fig. 11) is substantially equal to half the inner volume $V_1$ defined in a conventional sealed-beam headlamp between the externally convex glass lens section 19 and the concave glass reflector section 18a to the periphery of which said lens section 19 is fusion-sealed (Fig. 10). It results from this fact that in headlamps of the sealed-beam type according to the invention important savings are obtained concerning the amount of inert gas used for manufacturing such headlamps. As conventionally said sealed-beam headlamps are equipped with two filaments 20 and 21 respectively corresponding to highway and dipped lightings and mounted at approximately the focal point of the reflector section 18.

Of course, the lens profile may be modified without departing from the spirit and scope of the invention, provided that it is dished inwardly.

What I claim is:

1. A vehicle headlamp, comprising a concave reflector member of approximately paraboloidal shape, a lens extending across the open end of said reflector member and having an externally concave face extending rearwardly to provide a relatively small space between said face and said reflector member, and two filaments respectively corresponding to highway and dipped lightings and mounted on said reflector member so that said filaments coincide approximately with the focus of said reflector member.

2. A vehicle headlamp, comprising a concave reflector member of approximately paraboloidal shape, a lens extending across the open end of said reflector member and having an externally concave face extending rearwardly to provide a relatively small space between said face and said reflector member, two filaments respectively corresponding to highway and dipped lightings and mounted on said reflector member so that said filaments coincide approximately with the focus of said reflector member, and a convex reflecting surface formed by the inner face of said lens, said reflecting surface having a vertex, a center of focus and a center of curvature outside of said headlamp whereby the images of the filaments are always located between said vertex and said center of focus.

3. A vehicle headlamp, comprising a concave reflector member of approximately paraboloidal shape, a lens removably mounted across the open end of said reflector member and having an externally concave face extending rearwardly to provide a relatively small space between said face and said reflector member, and an independent bulb having two filaments respectively corresponding to highway and dipped lightings and mounted on said reflector member so that said filaments coincide approximately with the focus of said reflector member.

4. A vehicle headlamp of the sealed-beam type, comprising a concave glass reflector member of approximately paraboloidal shape, a glass lens fusion-sealed at the periphery of the open end of said reflector member and having an externally concave face extending rearwardly to provide a relatively small space between said face and said reflector member, two filaments respectively corresponding to highway and dipped lightings and mounted within the closed envelope defined between said lens and said reflector member at approximately the focal point of said reflector member, and an inert gas enclosed in said envelope.

5. A vehicle headlamp, comprising a concave reflector member of approximately paraboloidal shape, a lens removably mounted across the open end of said reflector member and having an externally concave face extending rearwardly to provide a relatively small space between said face and said reflector member, an independent bulb having two filaments respectively corresponding to highway and dipped lightings and mounted on said reflector member so that said filaments coincide approximately with the focus of said reflector member, and a convex reflecting surface formed by the inner face of said lens, said reflecting surface having a vertex, a center of focus and a center of curvature outside of said headlamp whereby the images of the filaments are always located between said vertex and said center of focus.

6. A vehicle headlamp of the sealed-beam type, comprising a concave glass reflector member of approximately paraboloidal shape, a glass lens fusion-sealed at the periphery of the open end of said reflector member and having an externally concave face extending rearwardly to provide a relatively small space between said face and said reflector member, two filaments respectively corresponding to highway and dipped lightings and mounted within the closed envelope defined between said lens and said reflector member at approximately the focal point of said reflector member, an inert gas enclosed in said envelope, and a convex reflecting surface formed by the inner face of said lens, said reflecting surface having a vertex, a center of focus and a center of curvature outside of said headlamp whereby the images of the filaments are always located between said vertex and said center of focus.

References Cited in the file of this patent

UNITED STATES PATENTS

| | | |
|---|---|---|
| 446,142 | Martin | Feb. 10, 1891 |
| 1,657,060 | Becket | Jan. 24, 1928 |
| 1,981,329 | Rivier | Nov. 20, 1934 |
| 2,135,480 | Birdseye | Nov. 8, 1938 |
| 2,317,031 | Cotman et al. | Apr. 20, 1943 |

FOREIGN PATENTS

| | | |
|---|---|---|
| 10,346 | Great Britain | of 1912 |
| 4,590 | Great Britain | Feb. 23, 1914 |
| 453,758 | France | Apr. 11, 1913 |